United States Patent
Lim et al.

(10) Patent No.: US 9,297,918 B2
(45) Date of Patent: Mar. 29, 2016

(54) SEISMIC DATA ANALYSIS

(71) Applicant: General Electric Company, Schenectady, NY (US)

(72) Inventors: Ser Nam Lim, Niskayuna, NY (US); John Robert Hare, Highland, NY (US); Jens Rittscher, Ballston Lake, NY (US); Jie Yu, Schenectady, NY (US); Ya Xue, Chapel Hill, NC (US)

(73) Assignees: GENERAL ELECTRIC COMPANY, Niskayuna, NY (US); EXXONMOBIL UPSTREAM RESEARCH COMPANY, Houston, TX (US)

( * ) Notice: Subject to any disclaimer, the term of this patent is extended or adjusted under 35 U.S.C. 154(b) by 190 days.

(21) Appl. No.: 13/729,769

(22) Filed: Dec. 28, 2012

(65) Prior Publication Data
US 2014/0188769 A1 Jul. 3, 2014

(51) Int. Cl.
*G06F 15/18* (2006.01)
*G01V 1/30* (2006.01)
*G01V 99/00* (2009.01)
*G06N 99/00* (2010.01)

(52) U.S. Cl.
CPC .............. *G01V 1/301* (2013.01); *G01V 99/00* (2013.01); *G01V 2210/64* (2013.01); *G06N 99/005* (2013.01)

(58) Field of Classification Search
CPC ... G01V 1/301; G01V 2210/64; G01V 99/00; G06F 15/18
See application file for complete search history.

(56) References Cited

U.S. PATENT DOCUMENTS

| | | |
|---|---|---|
| 4,916,615 A | 4/1990 | Chittineni |
| 4,992,995 A | 2/1991 | Favret |
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |

(Continued)

FOREIGN PATENT DOCUMENTS

| | | |
|---|---|---|
| AU | 3559102 A | 6/2002 |
| JP | 2001084462 | 3/2001 |

(Continued)

OTHER PUBLICATIONS

'Logistic Regression Models for R elevance Feedback III Content-Based Image Retrieval': Caenen, 2002, SPIE, 0277-786X, pp. 49-58.*

(Continued)

*Primary Examiner* — Kakali Chaki
*Assistant Examiner* — Peter Coughlan
(74) *Attorney, Agent, or Firm* — Fletcher Yoder, P.C.

(57) ABSTRACT

An approach for seismic data analysis is provided. In accordance with various embodiments, the active learning approaches are employed in conjunction with an analysis algorithm that is used to process the seismic data. Algorithms that may employ such active learning include, but are not limited to, ranking algorithms and classification algorithms.

21 Claims, 5 Drawing Sheets

(56) References Cited

U.S. PATENT DOCUMENTS

| | | | |
|---|---|---|---|
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Oayia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurent et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,697,373 B1 | 4/2010 | Padgett |
| 7,743,006 B2 | 6/2010 | Woronow et al. |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,385,603 B2 | 2/2013 | Beucher et al. |
| 8,447,525 B2 | 5/2013 | Pepper et al. |
| 8,515,678 B2 | 8/2013 | Pepper et al. |
| 2004/0225442 A1* | 11/2004 | Tobias et al. ............... 702/9 |
| 2004/0260476 A1* | 12/2004 | Borgos et al. ............. 702/14 |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop et al. |
| 2006/0184488 A1 | 8/2006 | Wentland |
| 2008/0123469 A1 | 5/2008 | Wibaux et al. |
| 2008/0175478 A1* | 7/2008 | Wentland et al. ........... 382/181 |
| 2008/0185478 A1 | 8/2008 | Dannenberg |
| 2008/0189269 A1* | 8/2008 | Olsen ........................... 707/5 |
| 2008/0270033 A1 | 10/2008 | Wiley et al. |
| 2010/0174489 A1 | 7/2010 | Bryant et al. |
| 2010/0175886 A1 | 7/2010 | Bohacs et al. |
| 2010/0211363 A1 | 8/2010 | Dorn et al. |
| 2010/0245347 A1 | 9/2010 | Dorn et al. |
| 2011/0054869 A1 | 3/2011 | Li et al. |
| 2011/0099132 A1 | 4/2011 | Fruehbauer et al. |
| 2011/0118985 A1 | 5/2011 | Aarre |
| 2011/0264430 A1 | 10/2011 | Tapscott et al. |
| 2011/0307178 A1 | 12/2011 | Hoekstra |
| 2012/0072116 A1 | 3/2012 | Dorn et al. |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0261135 A1* | 10/2012 | Nowak et al. ............. 166/369 |
| 2012/0322037 A1 | 12/2012 | Raglin |
| 2013/0006591 A1 | 1/2013 | Pyrez et al. |
| 2013/0138350 A1 | 5/2013 | Thachaparambil et al. |
| 2013/0144571 A1 | 6/2013 | Pepper et al. |
| 2013/0158877 A1 | 6/2013 | Bakke et al. |

FOREIGN PATENT DOCUMENTS

| | | |
|---|---|---|
| JP | 2003293257 | 10/2003 |
| JP | 2005244200 | 9/2005 |
| JP | 2012220500 | 11/2012 |
| WO | WO 9964896 | 12/1999 |
| WO | 0133255 A1 | 5/2001 |

OTHER PUBLICATIONS

'Probabilistic Reservoir Characterization via Seismic Elastic Inversion in East Andaman Basin *': Kishore, Mar. 2012, Search and Discovery article #40881 (2012).*

Helmy et al.,"Hybrid Computational Models for the Characterization of Oil and Gas Reservoirs", Expert Systems with Applications, vol. 37, Issue 7, pp. 5353-5363, Jul. 2010.

Castillo et al.,"Fuzzy Logic and Image Processing Techniques for the Interpretation of Seismic Data", Journal of Geophysics and Engineering, vol. 8, Issue 2, 2011.

Grabner, H., et al.; "On-line Boosting and Vision"; Conference on Computer Vision and Pattern Recognition, vol. 1, Jun. 17, 2006, pp. 260-267.

Ma, Aiyesha, et al.; "Confidence Based Active Learning for Whole Object Image Segmentation"; MRCS 2006, pp. 753-760.

Williams, David P.; "Classification and data acquisition with incomplete data"; Jan. 1, 2006, pp. 1-179; http://search.proquest.com/docview/305331087.

Carin, Lawrence, et al.; "Final Report Detection of Buried Targets via Active Selection of Labeled Data: Application to Sensing Subsurface UXO SERDP Project MM-1283"; Jun. 1, 2007, pp. 1-93; http://www.dtic.mil/get-tr-doc/pdf?Location=U2&doc=GetTRDoc.pdf&AD=ADA520344.

Grabner, Helmut, et al.; "Semi-supervised On-Line Boosting for Robust Tracking"; ECCV 2008, Part I, LNCS 5302, pp. 234-247.

Hashemi, H., et al.; "Gas Chimney detection based on improving the performance of combined multilayer perceptron and support vector classifier"; Nonlinear Processes in Geophysics, Oct. 21, 2008, pp. 863-871; http://www.nonlin-processes-geophys.net/15/863/2008.

Tuia, D., et al.; "Active Learning Methods for Remote Sensing Image Classification"; IEEE Transactions on Geoscience and Remote Sensing, vol. 47, No. 7, Jul. 1, 2009, pp. 2218-2232.

Bucaro, J.A., et al.; "Naval Research Laboratory Wide Area Detection and Identification of Underwater UXO Using Structural Acoustic Sensors—Final Report to SERDP MR-1513"; Jul. 8, 2011, pp. 1-85; http://www.dtic.mil/cgi-bin/GetTRDoc?Location+U2&doc+GetTRDoc.pdf&AD=ADA546324.

(56) References Cited

OTHER PUBLICATIONS

International Searching Authority, PCT/ISA/220; PCT/US2013/077179; mailed Jul. 9, 2014; pp. 1-23.
Ma, Aiyesha, et al.; "Confidence Based Active Learning for Whole Object Image Segmentation"; MRCS 2006, LNCS 4105, pp. 753-760.
Hashemi, H., et al.; "Gas chimney detection based on improving the performance of combined multilayer perceptron and support vector classifier"; Nonlinear Processes in Geophysics 15, 863-871, 2008.
Grabner, Helmut, et al.; "On-line Boosting and Vision"; Conference on CVPR 2006, IEEE Computer Society Jun. 2006, pp. 260-267.
Grabner, Helmut, et al.; "Semi-supervised On-Line Boosting for Robust Tracking"; Computer Vision A ECCV 2008, pp. 234-241.
Tuia, Devis, et al.; "Active Learning Methods for Remote Sensing Image Classification"; IEEE Transactions on Geoscience and Remote Sensing, vol. 47, No. 7, Jul. 1, 2009, pp. 2218-2232.
Invitation to Pay Additional Fees (form: PCT/ISA/208); PCT/US2013/077179, mailed Apr. 11, 2014.

\* cited by examiner

SEISMIC DATA ANALYSIS

BACKGROUND

The subject matter disclosed herein relates to the analysis of seismic data, such as to automatically identify features of interest.

Seismic data is collected and used for evaluating underground structures and features that might otherwise not be discernible. Such seismic data may be useful in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is in the interpretation and analysis of the large three-dimensional data sets that can be generated in a seismic survey project. In particular, analysis of such data sets may be tedious and time-consuming, potentially requiring months of manual work to analyze. Further, the complexity of the seismic data may limit the usefulness or effectiveness of automated approaches for data analysis.

BRIEF DESCRIPTION

In one embodiment a method is provided for analyzing seismic data. The method comprises the act of accessing a set of seismic data comprising a plurality of features of interest. The plurality of features of interest are processed using a classification algorithm. The classification algorithm outputs a list of possible classifications for each feature of interest. The list of possible classifications are processed using a ranking algorithm. The ranking algorithm outputs a ranked list of possible classifications for each feature of interest. During operation, the ranking algorithm generates a pool query set of respective queries related to the features of interest; submits one or more queries to a reviewer to obtain reviewer feedback; and updates the operation of the ranking algorithm based on the reviewer feedback to the queries. Each query comprises two or more ranked features of interest and the reviewer feedback to each query comprises an evaluation of the respective features of interest within the respective query.

In a further embodiment, a seismic data analysis system is provided. The seismic data analysis system comprises a memory storing one or more routines and a processing component configured to execute the one or more routines stored in the memory. The one or more routines, when executed by the processing component, cause acts to be performed comprising: processing a set of seismic data comprising a plurality of features of interest using a classification algorithm that outputs a list of possible classifications for each feature of interest and running a ranking algorithm on the list of possible classifications. The ranking algorithm outputs a ranked list of possible classifications for each feature of interest. During operation, the ranking algorithm: generates a pool query set of respective queries related to the features of interest; submits one or more queries to a reviewer to obtain reviewer feedback; and updates the operation of the ranking algorithm based on the reviewer feedback to the queries. Each query comprises two or more ranked features of interest and the reviewer feedback to each query comprises an evaluation of the respective features of interest within the respective query.

In an additional embodiment, a method is provided for analyzing seismic data. The method comprises the act of accessing a set of seismic data comprising a plurality of features of interest. The plurality of features of interest are classified as corresponding to a geological feature of interest using a classification algorithm. One or more ambiguous features of interest are selected from the plurality of features of interest. The one or more ambiguous features of interest are selected based on the degree to which a classification of a respective ambiguous feature of interest reduces the variance associated with the classification algorithm. One or more queries are submitted to a reviewer to obtain reviewer classifications of one or more of the ambiguous features of interest. The operation of the classification algorithm is updated based on the reviewer classifications.

In a further embodiment, a seismic data analysis system is provided. The seismic data analysis system comprises a memory storing one or more routines and a processing component configured to execute the one or more routines stored in the memory. The one or more routines, when executed by the processing component, cause acts to be performed comprising: accessing a set of seismic data comprising a plurality of features of interest; classifying the plurality of features of interest as corresponding to a geological feature of interest using a classification algorithm; selecting one or more ambiguous features of interest from the plurality of features of interest; submitting one or more queries to a reviewer to obtain reviewer classifications of one or more of the ambiguous features of interest; and updating the operation of the classification algorithm based on the reviewer classifications. The one or more ambiguous features of interest are selected based on the degree to which a classification of a respective ambiguous feature of interest reduces the variance associated with the classification algorithm.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
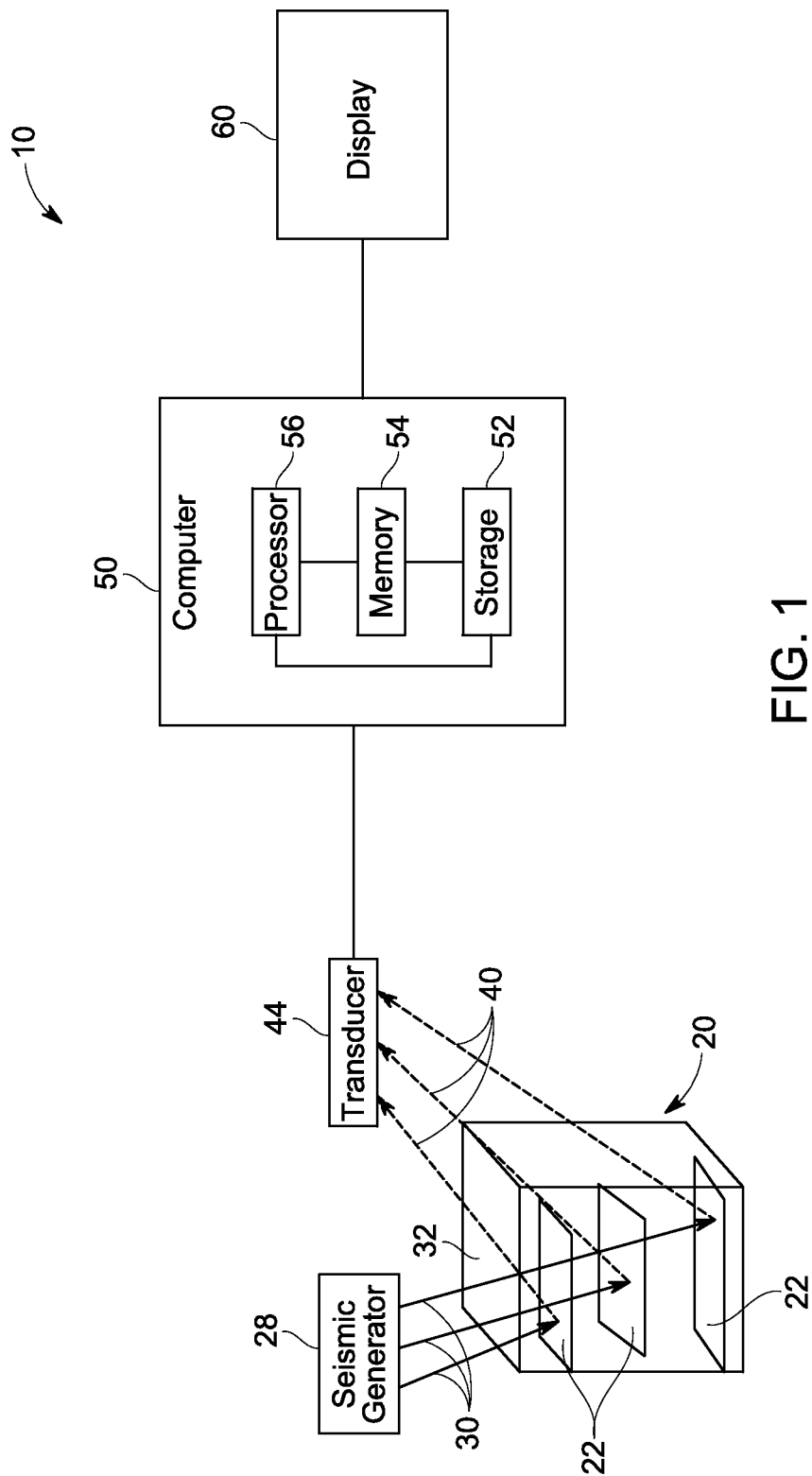
FIG. 1 depicts an example of a seismic data acquisition and analysis system, in accordance with aspect of the present disclosure.

Seismic data may be analyzed and used to detect subsurface features of interest, such as geological structures or formations that may be indicative of hydrocarbon resources. For example, identification of geobodies (e.g., channels, pinchouts, progrades, gas chimneys, and so forth) from a three-dimensional (3D) seismic survey may be performed as part of prospecting for hydrocarbons (e.g., oil, natural gas, and so forth). As generally used herein, a geobody is a feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time consuming and imprecise task of interpreting the 3D volumes generated from the acquired seismic data. For example, a single seismic volume may require mouths of manual work to analyze. As discussed herein, automated methods may make such time consuming work more feasible for a reviewer to interpret. However, automated interpretation of a 3D volume generated from seismic images may be difficult to achieve in practice. For example, it may be useful for an automated analysis of seismic data to classify and, in certain instances, rank or otherwise sort various features of interest (e.g., channels, pinchouts, progrades, gas chimneys, and so forth) identified in a seismic volume according to type and/or the degree of interest or preference for certain types of features. As generally used herein, a geobody is a feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

As will be appreciated, certain types of geological features (or features having certain characteristics) may be of more interest than other types. It would, therefore, be useful if the geological features that are of the greatest interest to the reviewer are ranked or sorted so as to make the review of these features more efficient or productive. With this in mind, the present approaches relate to various active learning techniques that may be used in the analysis of seismic data volumes. Active learning approaches are differentiated from passive approaches, in which user feedback may simply be examined or analyzed for patterns or helpful input, such as when a user selects a presented search result. In such passive approaches the selections being reviewed by the user are not actively formulated to further refine the performance of the learning algorithm and are not evaluated by the user directly as to the quality or correctness of the result.

In contrast, active learning approaches, as discussed herein, relate to those approaches where user or expert feedback may be sought, but it is sought in response to actively formulated queries or data presentations that are constructed to resolve the greatest amount of the remaining ambiguity within the data set undergoing examination. Further, such active approaches may actually involve or request a judgment or evaluation by the reviewer, such as to whether a classification or ranking is good or not, which may allow adjustment of the underlying algorithm to better resolve ambiguities in the data. As discussed herein, such active learning processes may include the automated generation and presentation of a limited set of queries or results to an expert to obtain the expert's feedback and to thereby resolve the greatest ambiguity in the data being evaluated with, optimally, the fewest number of queries. As will be appreciated, the ambiguity which may be addressed in the active approach may relate to the diversity or variance in the underlying data and, in particular, to resolving those data points that are difficult to classify or rank due to not clearly (i.e., unambiguously) falling into one classification, rank, and so forth.

With the foregoing in mind, the following discussion relates various approaches using active learning techniques that may be used to facilitate user review of a seismic data set. By way of brief introduction, it should be appreciated that such automated approaches to analyzing seismic data may involve algorithms used to identify features of interest within a seismic volume, to classify these features into different types or by different characteristics, and, in some instances, to separately rank a set of classified features to further facilitate user review.

With this in mind, and as discussed herein, the present active learning approaches may be utilized in conjunction with a 3D seismic data set generated using any suitable seismic surveying system. Turning to FIG. 1, a high-level overview of one such seismic surveying system 10 is provided by way of example. In the depicted example, a subsurface volume 20 is probed by the seismic surveying system 10. The subsurface volume 20 may typically include various layers or strata 22 at different depths and orientations within the volume 20. These various strata 22 define respective boundaries and transitions within the volume which may act to reflect waves (e.g., seismic or acoustic waves) propagating through the subsurface volume 20. Likewise, other features within the subsurface volume (e.g., channels, pinchouts, progrades, gas chimneys, and so forth) may also include surfaces, transitions, or boundaries that act to reflect acoustic or seismic waves.

In the depicted example, a seismic generator 28 of some form (such as one or more controlled detonations, an air gun or cannon, or another suitable source of seismic waves) is part of the seismic surveying system 10. The seismic generator 28 can typically be moved to different positions on the surface of the volume 20 and can be used to generate seismic waves 30 at different positions on the surface 32 that penetrate the subsurface volume 20 under investigation. The various boundaries or transitions within the subsurface 20 (either associated with the various layers or strata 22 or with more complex geological features) cause the reflection 40 of some number of the seismic waves 30. One or more transducers 44 at the surface 32 may be used to detect the waves 40 reflected by the internal structures of the subsurface volume 20 and to generate responsive signals (i.e., electrical or data signals).

These signals, when reconstructed, represent the internal boundaries and features of the subsurface volume 20. For example, in the depicted embodiment, the signals are provided to one or more computers 50 or other suitable processor-based devices that may be used to process the signals and reconstruct a volume depicting the internal features of the subsurface volume 20. In one embodiment, the computer 50 may be a processor-based system having a non-volatile storage 52 (such as a magnetic or solid state hard drive or an optical media) suitable for storing the data or signals generated by the transducer 44 as well as one or more processor-executable routines or algorithms, as discussed herein, suitable for processing the generated data or signals in accordance with the present approaches. In addition, the computer 50 may include a volatile memory component 54 suitable for storing data and signals as well as processor-executable routines or algorithms prior to handling by the processor 56. The processor 56 may, in turn, generate new data (such as a volumetric representation of the subsurface volume 20 and/or a set of features of interest identified in such a reconstructed volume) upon executing the stored algorithms in accordance with the present approaches. The data or reconstructions generated by the processor 56 may be stored in the memory 54 or the storage device 52 or may be displayed for review, such as on an attached display 60.

Figure 2:
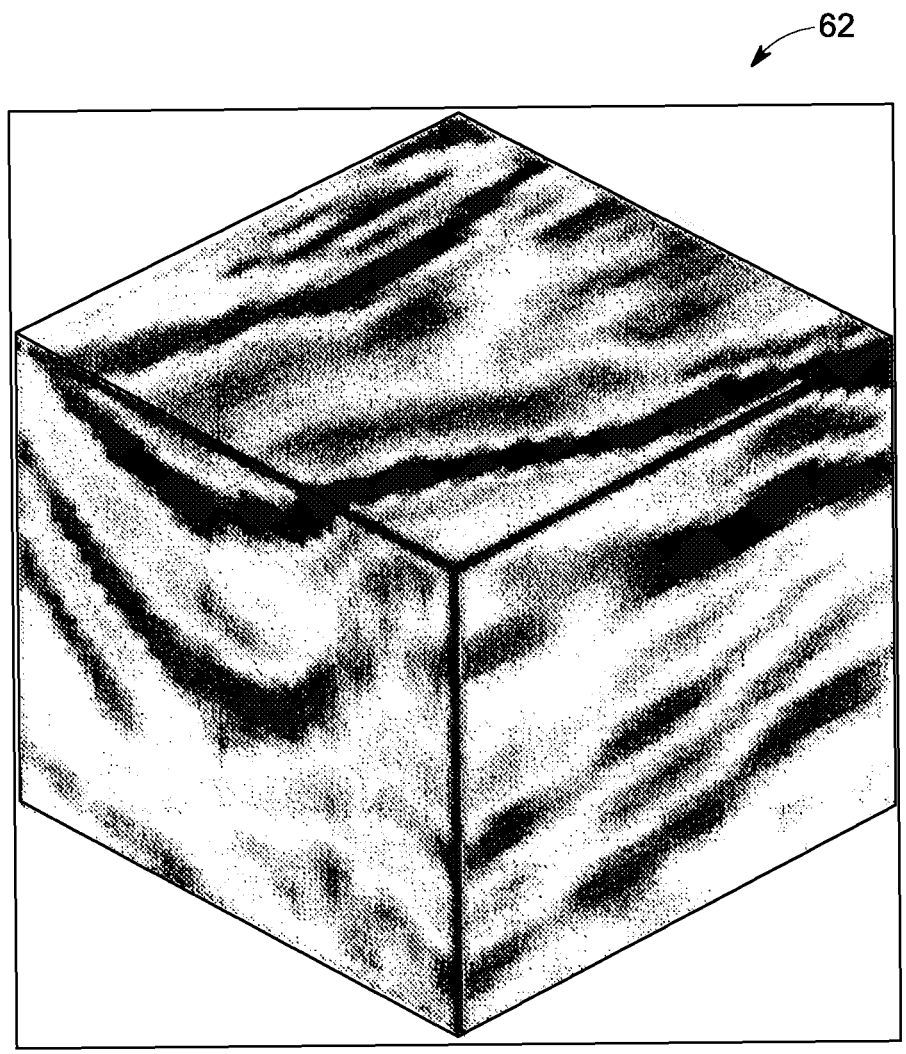
FIG. 2 depicts an example of a volume of seismic data for analysis, in accordance with aspect of the present disclosure.

Turning to FIG. 2, a representation of a reconstruction 62 of 3D seismic data of a portion of a subsurface volume 20 is depicted. As depicted in FIG. 2, such a reconstruction 62 may depict features of the subsurface volume 20, such as various strata, layers, and geological features, which due to geological processes and time scales, may be at various orientations relative to one another. As will be appreciated, manual inspection of large amounts of such reconstructed data may be challenging and time-consuming.

With this in mind, various approaches are discussed herein to facilitate automated inspection of such seismic volumes. In certain of these embodiments, a set of features that may be of interest (i.e., geological structures or formations of interest) is automatically generated and provided to a reviewer or displayed in conjunction with the volume, allowing the reviewer to more efficiently analyze the seismic volume for features that are of interest. As part of this process, the identified features may be classified and/or may be ranked based on likely interest to facilitate the user's examination.

As will be appreciated from the above discussion, in certain embodiments of the present approach, expert inputs are elicited that will have the most impact on the efficacy of a learning algorithm employed in the analysis, such as a classification or ranking algorithm, and which may involve eliciting a judgment or evaluation of classification or rank (e.g., right or wrong, good or bad) by the reviewer with respect to a presented query. Such inputs may be incorporated in real-time in the analysis of seismic data, either in a distributed or non-distributed computing framework. In certain implementations, queries to elicit such input are generated based on a seismic data set undergoing automated evaluation and the queries are sent to a workstation (e.g., computer 50) for an expert to review.

In one embodiment, based upon the expert feedback (such as the selection of a presented geological feature as being of interest) a ranking algorithm, as discussed herein, may update a set of displayed and ranked search results of geological features present in the seismic data. In this manner, the ranked features provided for review as potentially being of interest will gradually be improved in quality as the reviewer's selections are used to refine the performance of the ranking algorithm. For example, reviewer selection of a feature of interest (such as in response to a query posed by the system) reinforces selection and presentation of like features. In this manner, selections that are highly rated by the reviewer are used to preferentially rank similar features as being of interest, thus facilitating the review process by preferentially presenting or highlighting those features believed to be of interest.

By way of example of one such embodiment, a classification algorithm (i.e., a classifier, f) is employed to initially classify a number of regions or features of interest identified within a seismic volume 62. As part of the classification, the classifier may also assign an initial probability to the classification. In one implementation, a separate ranking algorithm (i.e., a ranker, h) processes the output of the classification algorithm and re-orders each identified and classified geological feature according to the respective probabilities that each of the classified geological features is of the assigned type (e.g., channel, pinchout, chimney, or parallel seismic facies). By deriving these respective rankings, the rankings may be improved and, thus, may be of more use to a reviewer.

In one implementation, a classifier, f, is initially trained offline using previously labeled examples of the respective classes of geological features. The trained classifier, f, may then be used to generate a ranked list of possible classifications for each feature undergoing classification during live execution of the classifier (i.e., on an unlabeled data set). In one such implementation, the ranked list for each respective identified feature would include a probabilistic score from 0 to 1 for each of the possible classes for that feature. The ranked list of classifications derived for each feature can then be combined to generate a single ranked list of geological features, with those features listed higher on the list being of greater interest or importance.

In certain embodiments, the classification algorithm f is a multi-class classifier and is based on a branching or tree-type structure (e.g., a decision tree) whereby classifying a respective feature involves assigning a ranking or probability to different classifications in accordance with the decision tree. In this manner, the classification algorithm, f, may generate a list of possible classifications for each identified feature, with each possible classification being associated with a corresponding initial rank or probability based on the operation of the classification algorithm. In one embodiment, based on the probabilistic scores, the output of the classifier is a ranked list that is ranked in order of interest or importance with respect to the possible class labels for the one or more classified features of interest.

Figure 3:
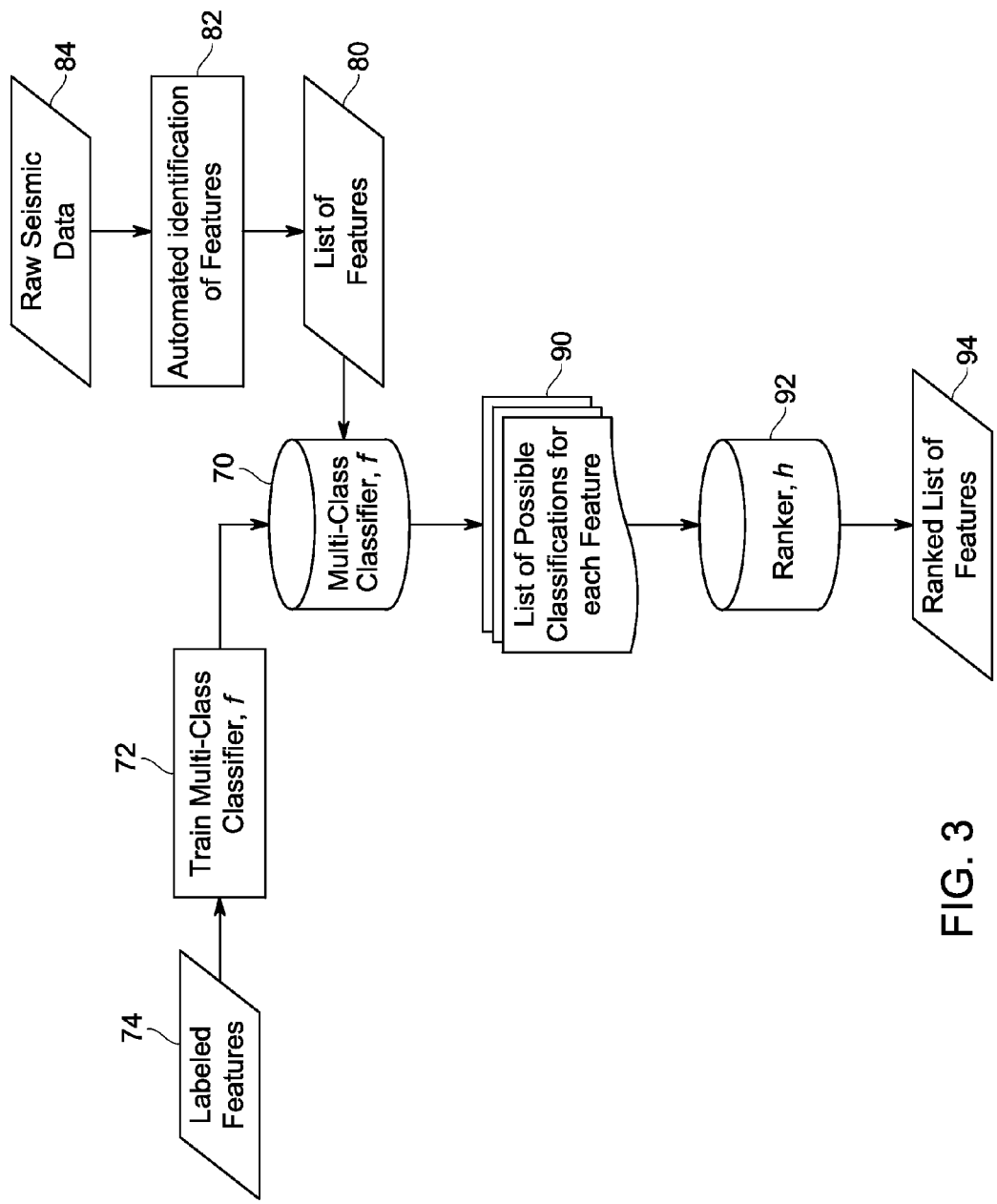
FIG. 3 depicts a process flow diagram for analyzing a seismic data set using separate and distinct classification and ranking algorithms, in accordance with aspect of the present disclosure.

By way of example, and turning to FIG. 3, an example of a flow diagram of a corresponding high-level process is provided. In this example, a multi-class classification algorithm 70 is initially trained (block 72) using a set of labeled features 74, such as geological features from a known data set that have been classified by an expert or otherwise proven. In this example, the trained classifier 70 may then be used to process one or more features 80 identified (block 82) in a set of seismic data 84 (e.g., a seismic volume). For example, a computer-implemented routine may be employed to automatically identify a list of likely geological features of interest within the seismic data 84.

The trained classifier 70 generates a list 90 containing the possible classifications for each identified feature (i.e., each feature being analyzed may give rise to a respective list of possible classifications for that feature). In one embodiment, the classifier 70 generates a probability or ranking associated with each classification on the respective lists 90. In the depicted example, the results of the classification algorithm 70 (i.e., lists 90) are provided to a separate ranking algorithm 92 (i.e., ranker, h) to generate a ranked list 94 of the identified features by type and by certainty or confidence in the classification. For example, if channels were specified to be the type of geological feature of most interest, the ranked list 94 may list those identified features determined to have the highest probability of being channels at the top of the list.

In certain implementations active ranking approaches are employed to refine performance of the ranking algorithm 92. As discussed herein, active ranking approaches are a special case or subset of active learning approaches where the active learning context pertains to a ranking context, such as where a set of previously generated classifications are ranked or sorted. In one such implementation, the ranker 92 (h) is distinct from the classifier 70 (f) such that the expert feedback affects performance of the ranking algorithm 92, but not the classification algorithm 70. That is, in such an implementation, the classification algorithm 90 can function in an unchanged manner while the ranking algorithm 92 undergoes active learning or other modification to more optimally interpret the outputs of the classifier algorithm 90.

In accordance with one example, an active ranking scheme employs a pool query set, which is the set of queries for which expert determination will be sought in order to improve the performance of the ranking algorithm 92 with respect to ambiguous geological features. With respect to the pool query set, one issue that arises in the active querying process with respect to seismic data is the absence of a consistent (i.e., objective) querying framework. In particular, the potential lack of uniformity in the evaluation of seismic data may hinder the development of a global approach to formulating queries.

Figure 4:
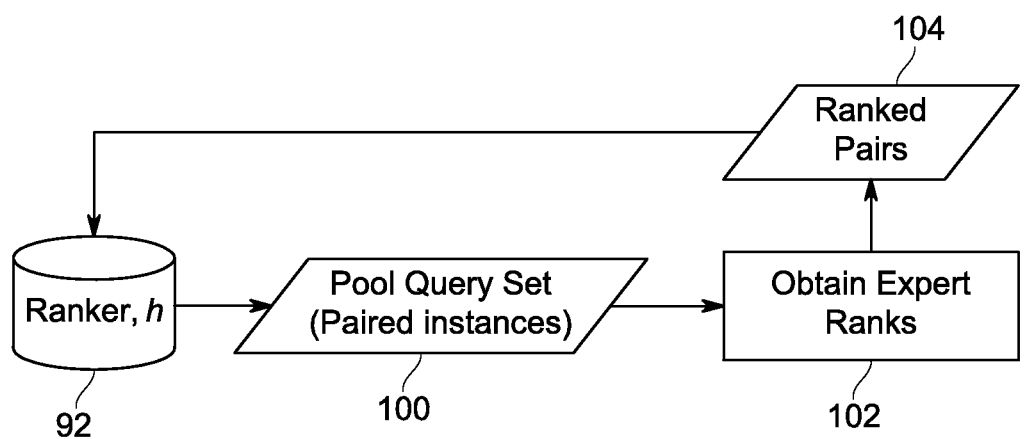
FIG. 4 depicts a process flow diagram for training a ranking algorithm, in accordance with aspect of the present disclosure.

With this in mind, in certain implementations pairs of classified features may be presented to a reviewer as a query to elicit the reviewer's opinion as to which geological feature of the presented pair is more likely to be properly classified, i.e., is better classified. Such a pairwise comparison is in contrast with presenting customized queries related to each individual ambiguous feature classification. That is, this approach of providing paired, classified features for ranking allows for active learning with respect to ranking, by formulating and presenting those pairs of classified features for review which will provide the most useful feedback for reducing the remaining ambiguity in the ranking results. An example of this approach is depicted in FIG. 4, in which the ranking algorithm 92 is depicted in conjunction with a pool query set 100 of paired instances for ranking by a reviewer (block 102). As depicted in this example, the reviewer's rankings 104 within each presented pair are then used to train the ranking algorithm 92 and to improve the ranked lists generated by the ranking algorithm 92. In one implementation, pairs of classified geological features may be presented to a reviewer as a query to elicit the reviewer's opinion as to which classified feature of any pair should be ranked higher, i.e., to elicit a relative ranking.

With the foregoing in mind, the pairwise comparison approach provides useful mathematical properties that may facilitate implementation of the present active ranking approach. For example, consider a feedback function $\Phi$, the domain of which contains all pairs of instances, where an instance is defined as $x_i = (g_i, l_i)$, where $g_i$ is the respective geological feature being examined and $l_i$ is the label or classification that the classification algorithm, f, 70 has assigned to the respective features. For any pair of instances $x_0$, $x_1$, $\Phi(x_0, x_1)$ is a real number that indicates whether $x_1$ should be ranked above $x_0$. For example, if $\Phi(x_0, x_1)$ is greater than 0, the reviewer has indicated that $x_1$ should be ranked above $x_0$. Conversely, if $\Phi(x_0, x_1)$ is less than 0, the reviewer has indicated that $x_1$ should be ranked below $x_0$. If $\Phi(x_0, x_1)$ equals 0, the reviewer has indicated no preference between $x_0$ and $x_1$ with respect to ranking. Because $\Phi(x_0, x_1) = -\Phi(x_1, x_0)$, another function $D(x_0, x_1)$ may be employed where $D(x_0, x_1) = c \cdot \max\{0, \Phi(x_0, x_1)\}$, which ignores all negative entries of $\Phi$. As will be appreciated, c ensures that:

$$\Sigma_{x_0, x_1} D(x_0, x_1) = 1. \quad (1)$$

A further aspect of such a pairwise comparison implementation is the process by which candidate instances are selected for review by a reviewer for ranking. In certain implementations, choosing or generating the pool query set 100 is a matter of maximizing the diversity of the pool query set and reducing the clarity of each candidate. With respect to the issue of clarity, a suitable metric may be used that is indicative of the amount of ambiguity in a candidate instance $x_i$.

In one implementation, the clarity of an unlabeled instance $x_i$ may be represented as:

$$RL(x_i, f, T) = \frac{1}{n_0} |\{j : f(x_i) \le f(x_j), y_j = 0\}| \quad (2)$$

$$IL(x_i, f, T) = \frac{1}{n_1} |\{j : f(x_i) > f(x_j), y_j = 1\}|, \quad (3)$$

and $$CL(x_i, f, T) = |RL(x_i, f, T) - IL(x_i, f, T)| \quad (4)$$

where $$T = \{(x_1, y_1), (x_2, y_2), \ldots, (x_n, y_n)\} \quad (5)$$

is the set of instances that have been labeled by previous active ranking rounds, i.e., ranked pairs 104. Bootstrapping the active ranking may involve randomly selecting unlabeled instances until T can be established, taking the median instance in an initial ranked list, or other suitable approaches.

With respect to the diversity of the pool query set, it may be useful to have a pool query set 100 that is as diverse as possible. In one embodiment, to construct a diverse pool query set 100, two different measures may be considered, one measure that is based on angular diversity and another measure that is based on entropy. To consider the angular diversity of the pool query set, the angular diversity between two instances $x_i$ and $x_j$ can be computed as:

$$\cos(\angle(x_i, x_j)) = \left| \frac{\langle (x_i - x_c), (x_j - x_c) \rangle}{\|x_i - x_c\| \|x_j - x_c\|} \right| \quad (6)$$

where $x_c$ is the mean of the relevant instances and $\langle \cdot \rangle$ denotes the dot product. After minimizing, this gives:

$$\max_{i \in QS} \cos(\angle(x_i, x_j)) \quad (7)$$

which provides a diverse pool query set of instances. In this example, QS are the instances that have already been chosen for the pool query set and $x_j$ is the new diverse instance. In one such implementation, to construct the final pool query set the convex combination:

$$F(i) = \beta CL(x_i, f, T) + (1 - \beta) \max_{i \in QS} \cos(\angle(x_i, x_j)) \quad (8)$$

is computed, where $\beta$ represents a pre-specified mixing parameter. Apart from the angular diversity of the pool query set, the standard entropy measure may also be tested to establish sufficient diversity.

With the foregoing discussion in mind related to the construction of the pool query set 100, and as discussed herein, the pool query set 100 provides a basis for providing pairs of instances, as queries, to one or more reviewers for relative ranking. As noted above, in certain of implementations where the ranker 92 and classifier 70 are separate, the obtained reviewer feedback is not used to refine the classification results (i.e., the operation of the classification algorithm 70 of FIG. 3). Instead, as noted above, the operation of the classifier 70 and ranker 92 are separate, and the reviewer feedback (i.e., pair rankings) is used to train the ranker 92 without modifying the operation of the classifier 70. Having a ranking algorithm 92 that is used and trained separately from the classification algorithm 70 allows the operation of the classifier algorithm 70 to be kept intact (i.e., unchanged) and instead allows the ranking algorithm 92 to be trained to interpret and rank the outputs of the classifier 70. Thus, this approach of boosting (or otherwise improving) a separate ranking algorithm 92 avoids the tedious process of modifying the classification algorithm 70, instead iteratively improving weak rankers as active feedback is collected, thereby allowing improved interpretation of the results of the classification algorithm 70. In addition, by having separate ranking and classification algorithms, the overall system may be generic with respect to the classification algorithm 70 such that new or different classification algorithms 70 may be substituted when desired.

While the preceding discussion describes the construction of the pool query set 100 and the use of paired comparisons, the following discussion relates to the training of a ranking algorithm 92. With respect to such training, in one implementation a weak ranking algorithm, h, 92 is initially provided which takes the probability provided by the classification algorithm 70 for each classification and simply thresholds these initial probabilities:

$$h(x) = \begin{cases} 1 & \text{if } f(x) > \theta \\ 0 & \text{if } f(x) \leq \theta \\ q_{def} & \text{if } f(x) = \perp \end{cases} \quad (9)$$

where $\perp$ indicates that the instance is unranked by the classification algorithm (f).

As discussed herein r may be defined as:

$$r = \sum_{x_0, x_1} D(X_0, x_1)(h(x_1) - h(x_0)) \quad (10)$$

$$= \sum_{x_0, x_1} D(x_0, x_1)h(x_1) - \sum_{x_0, x_1} D(x_0, x_1)h(x_0)$$

$$= \sum_x h(x) \sum_{x'} D(x', x) - \sum_x h(x) \sum_{x'} D(x, x')$$

$$= \sum_x h(x) \sum_{x'} (D(x', x) - D(x, x'))$$

$$= \sum_x h(x) \pi(x)$$

where $$\pi(x) = \sum_{x'} (D(x', x) - D(x, x')) \quad (11)$$

is the potential of x. In certain implementations, the quantity of r is maximized since this value represents that $D(x_0, x_1)$ (i.e., the reviewer feedback) agrees with $h(x_1) - h(x_0)$, thereby allowing determination of the best $\theta$ and $q_{def}$. By further extension $$r = \sum_{x: f(x) > \theta} h(x)\pi(x) + \sum_{x: f(x) \leq \theta} h(x)\pi(x) + \sum_{x: f(x) = \perp} h(x)\pi(x) \quad (12)$$

$$= \sum_{x: f(x) > \theta} \pi(x) + q_{def} \sum_{x: f(x) = \perp} \pi(x)$$

Since:

$$\Sigma_{x: f(x) = \perp} \pi(x) = -\Sigma_{x: f(x) \neq \perp} \pi(x) \quad (13)$$

this equates to:

$$r = \Sigma_{x: f(x) > \theta} \pi(x) - q_{def} \Sigma_{x \in \chi} \pi(x) \quad (14)$$

where $\chi$ is the set of feedback instances ranked by the classification algorithm (f).

With the foregoing in mind, two algorithms can be formulated which in combination provide the active ranking functionality described herein. As will be appreciated, the two algorithms can be characterized by various control logic steps which can in turn be represented in any suitable processor-executable code for implementation on a computer or an application specific device. The first algorithm can be used to calculate $\theta$ and $q_{def}$ and assumes the presence of a classification algorithm, f, and a set of feedback instances $\chi$ ranked by the classification algorithm. In accordance with this first algorithm:

```
L = 0
R = ∑_{x∈χ} π(x)
θ_0 = ∞
for j = 1, ... J, do
    L = L + ∑_{x: θ_{j-1} ≥ f(x) > θ_j} π(x)
    if |L| > |L - R| then
        q = 0
    else
        q = 1
    end if
    if |L - qR| > |r| then
        r* = L - qR
        i* = i
        θ* = θ_j
        q_{def}* = q
    end if
end for
return θ, q_{def}
```

The second algorithm provides updates to the ranking algorithm h (i.e., ranker boosting) in view of the reviewer feedback and assumes the presence of a classification algorithm, f, and the $\theta$ and $q_{def}$ values returned by the first algorithm. In accordance with the second algorithm:

```
for t = 1, ... , T do
    get weaker ranking using algorithm 1: h_t: χ → R
    choose α_t ∈ R
    update: D_{t+1}(x_0, x_1) = D_t(x_0, x_1)exp(α_t(h_t(x_0) - h_t(x_1))) / Z_t
end for
return
```

-continued $$H(x) = \sum_{t=1}^{T} \alpha_t h_t(x)$$

As noted above, in combination algorithm 1 and algorithm 2 can be implemented to provide an active ranking algorithm. Referring to algorithm 2, the ranking loss of H can be characterized as:

$$rloss_D(H) \leq \Pi_{t=1}^T Z_t \quad (15)$$

Therefore, at each round of t, an $\alpha_t$ may be selected so as to minimize:

$$Z_t = \Sigma_{x_0,x_1} D_t(x_0,x_1) \exp(\alpha_t(h_t(x_0)-h_t(x_1))) \quad (16)$$

For a weak ranking algorithm iteration in [0,1]:

$$Z \leq \sqrt{1-r^2} \quad (17)$$

where $$r = \Sigma_{x_0,x_1} D(x_0,x_1)(h(x_1)-h(x_0)) \quad (18)$$

such that the goal is maximizing r. Once r is maximized, $\alpha$ should be set such that:

$$\alpha = \frac{1}{2} \ln\left(\frac{1+r}{1-r}\right) \quad (19)$$

As will be appreciated from the preceding discussion, an active ranking application of active learning, such as described above, may utilize a trained classifier f that generates a ranked list as an output and may further employ a weak ranker h that is improved using active ranking approaches that incorporate feedback from a user. The user feedback is obtained in response to a set of queries that are generated with a goal of reducing ambiguity with respect to the generated rankings (i.e., to better discern and discriminate between what are otherwise close calls related to a ranking). In particular, in certain embodiments the query format uses a pairwise approach and generates queries based on diversity and clarity.

Other approaches, as discussed below, may also be employed that may be characterized as active learning, though which are distinct form the active ranking approach discussed above. For example, in one such active learning approach discussed below, a training data set may be employed for training an algorithm used to evaluate seismic data. With this training, user elicited feedback is incorporated to improve the function of the evaluation algorithm. In one implementation, queries are generated by selecting data points that are ambiguous from the perspective of the algorithm and obtaining user feedback to resolve the ambiguity with respect to the selected data points. For example, ambiguous data points may be selected for presentation to a reviewer which, once resolved, may be used to improve the performance of the algorithm to reduce the greatest amount of ambiguity in the remaining data points from the perspective of the active learning algorithm.

With this in mind, in a further embodiment a logistic regression algorithm (or other linear classifier or model) may be employed in the evaluation of features of interest within a seismic data set undergoing evaluation. In this approach, an active learning aspect involves soliciting reviewer feedback to reduce the variance associated with the logistic regression algorithm, thereby improving performance of the algorithm at identifying geological features of interest. For example, queries may be selected so as to elicit responses that will provide the greatest reduction in variability associated with a regression model used in the classification process. That is, a determination is made as to which geological regions or features of interest would be most helpful in improving the performance of the classification algorithm if they were to be correctly classified by a reviewer.

In one embodiment, a self-monitoring system may be employed such that changes in the data properties (i.e., due to the addition of data, the evaluation of a new portion of existing data, and so forth) are detected which trigger the active-learning functionality. Such a self-monitoring active-learning approach may be useful to address issues related to within-site variances. For example, in one implementation, the system, as it evaluates a seismic data volume, continuously monitors the statistical distribution of the data subset it is currently examining. If a change in data properties (i.e., a change in the statistical distribution) is detected as part of this ongoing monitoring, the system may trigger the active learning module automatically, thereby requesting human (e.g., expert) assistance in the form of queries presented to the reviewer. Based on the feedback received from the reviewer, the analysis parameters associated with the active learning algorithm) may be tuned and the evaluation of the seismic data can continue.

Figure 5:
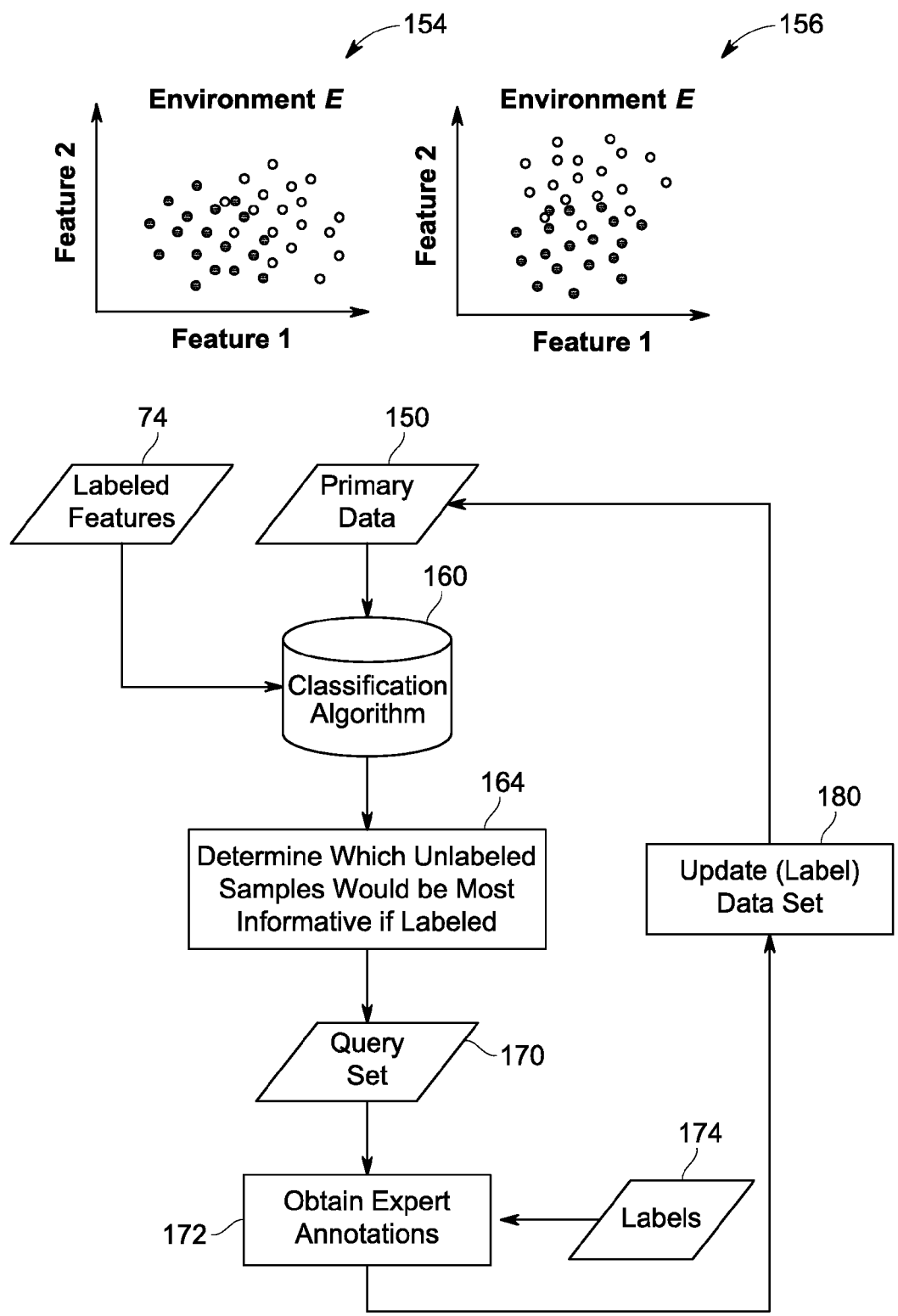
FIG. 5 depicts a process flow diagram for analyzing a seismic data set, in accordance with aspect of the present disclosure.

For example, turning to FIG. 5, in this depiction a primary data set 150 that is not initially labeled is depicted and is to undergo automated labeling (i.e., classification of identified features within the data set). A training data set of labeled geological regions or features of interest 74 is also provided which is used to train the classification algorithm. In this example, the training data set corresponds to a different seismic data set than the primary data set 150 and thus is mismatched or poorly matched with respect to the primary data set 150. That is, the training data set has a mismatch with the primary data set 150 in the statistical distribution of features to be labeled (as demonstrated by charts 156 depicting features of Environment, E, and 154 depicting feature of a related, but different, environment, Ê) such that the training data set cannot be used to unambiguously label all features of interest in the primary data set 150.

A classification algorithm f 160 attempting to model, and label, the features within the primary data set 150 may utilize the training data set of labeled feature 74 to construct a model that labels the features of the primary data set 150 to the extent which the data mismatch allows. Based upon this, a query set 170 of unlabeled features within the primary seismic data 150 is determined (block 164) to present (block 172) to a reviewer to assign labels 174. The query set 170 is generated so as to include requests for reviewer feedback (i.e., labels 174) for those unlabeled features of the primary data set 150 which, if labeled, would allow for the greatest reduction in the variability associated with the model. For example, in one implementation reviewer feedback in the form of labels 174 is requested for those features which, once labeled, will allow the greatest number of additional unlabeled features to be automatically classified by the classification algorithm correctly.

It should be appreciated that, though the above description suggests that some initial modeling, and labeling, of features may be performed by the classification algorithm 160, in other implementations the classification algorithm 160 does not initially attempt to label any features of interest in the primary data set 150 and instead attempts to identify which unlabeled features of the primary data set 150 would be of the most value to have labeled by a reviewer. This may also be true in implementations related to active ranking, as discussed above. Based upon the labels 174 provided by the reviewer, the primary seismic data 150 may be relabeled (block 180), so as to reduce the statistical distribution mismatch between the primary seismic data 150 and training seismic data of labeled features 74, allowing the classification algorithm 160 to better classify other features within the primary seismic data 150. In one embodiment, the approach requests labels 174 that maximize the determinant ($Q^{-1}$), where $Q^{-1}$ is the inverse Fisher information and where $Q^{-1}$ is the lower bound of the covariance matrix of the estimated classifier w, as discussed below.

With this in mind, the training data set may be characterized as:

$$D^a = \{x_n^a, y_n^a\}_{n=1,\ldots,N^a} \tag{20}$$

such that all features 74 of interest in the training data set are labeled. Conversely, the primary data set 150 may be characterized as:

$$D^P = \{D_l^P, D_u^P\} \text{ where} \tag{21}$$

$$D_l^P = \{x_n^P, y_n^P\}_{n=1,\ldots,N_l^P} \tag{22}$$

is the labeled portion of the primary data set 150 and $$D_u^P = \{x_n^P\}_{n=N_l^P+1,\ldots,N_l^P+N_u^P} \tag{23}$$

is the unlabeled portion of the primary data set 150.

The classifier f, in accordance with one algorithm, may then be characterized such that:

$$\max_f \prod_{n=1}^{N_l^P} \sigma(f^T x_n^P)^{y_n^P} [1 - \sigma(f^T x_n^P)]^{1-y_n^P} \cdot \tag{24}$$

$$\prod_{i=1}^{N^a} \sigma(f^T x_i^a + \mu_i)^{y_i^a} [1 - (f^T x_i^a + \mu_i)]^{1-y_i^a}$$

and such that:

$$\frac{1}{N^a} \sum_{i=1}^{N^a} y_i^a \mu_i \leq C, \; C > 0 \tag{25}$$

$$y_i^a \mu_i \geq 0, \; i = 1, \ldots, N^a$$

where $\mu_i$ is a compensation factor for the statistical distribution mismatch between the primary data set 150 and the training data set of labeled features 74.

With this in mind, the Fisher information may be characterized as:

$$Q = E_{\{Y^a, Y^P\}} \frac{\partial L}{\partial f} \frac{\partial L^T}{\partial f} \tag{26}$$

where L is a log likelihood. In one such implementation, the selection of labels proceeds in a sequential manner in which, initially, the labeled primary set, $D_l^P$, is empty (i.e., all features of the primary data set 150 is unlabeled). In one embodiment, one at a time, an unlabeled sample is selected from the primary data set 150, is labeled by a reviewer, and is moved from $D_u^P$ to $D_l^P$ (i.e., from an unlabeled state to a labeled state within the primary data set 150. The classifier f (i.e., classification algorithm 160) and Fisher information Q are correspondingly updated based on the labeling of the sample feature. In this example, at each iteration, the selection of the feature to be labeled, $x_*$, is based on:

$$x_* = \max_{x_n \in D_u^P} \det(Q + \sigma_n(1-\sigma_n)x_n^T x_n)$$

$$\sigma_n = \sigma(f^T x_n) \tag{27}$$

such that each iteration, the selection of the feature to be provided for classification to the reviewer provides the maximum information for the classifier f (i.e., classification algorithm 160).

Technical effects of the invention include automatic analysis or evaluation of a seismic data set based on, in certain implementations, a separate implementation of a classification algorithm and a ranking algorithm, where active learning is used to train and update operation of the ranking algorithm. In other implementations, a linear model, such as a linear regression algorithm, is used to classify features within a seismic data set. Active learning may be employed with respect to the classification by analyzing unlabeled features within the seismic data set and selecting, sequentially, those features or samples which, if classified by a reviewer, would reduce the variance associated with the model to the greatest extent.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for analyzing seismic data, comprising the acts of:
   accessing a set of seismic data comprising a plurality of features of interest;
   processing the plurality of features of interest using a classification algorithm, wherein the classification algorithm is a multi-class classifier based on a decision tree that outputs a list of possible classifications for each feature of interest with an associated probability for each listed classification for a respective feature; and
   processing the list of possible classifications using a ranking algorithm, wherein the ranking algorithm outputs a ranked list of possible classifications for each feature of interest;
   wherein, during operation, the ranking algorithm:
       generates a pool query set of respective queries related to the features of interest, wherein each query comprises a pair of ranked features of interest that has been classified as the same type of feature;
       submits one or more queries to a reviewer to obtain reviewer feedback, wherein the reviewer feedback to each query comprises a selection of which feature in the pair of ranked features is more likely correctly classified; and
       updates the operation of the ranking algorithm based on the reviewer feedback to the queries.

2. The method of claim 1, further comprising:
   accessing a set of labeled features of a training set of seismic data; and
   training the classification algorithm using the set of labeled features.

3. The method of claim 1, wherein the multi-class classifier is configured to generate multiple classifications and associated probabilities for each feature of interest identified in the seismic data.

4. The method of claim 1, wherein the list of possible classifications for each feature output by the classification algorithm comprises an initially ranked list.

5. The method of claim 1, wherein the operation of the classification algorithm is not updated based on the reviewer feedback to the queries.

6. The method of claim 1, wherein the ranking algorithm selects the pair of ranked features of interest included in the pool query set based on angular diversity of the pair of ranked features of interest.

7. A seismic data analysis system, comprising:
a memory storing one or more routines; and
a processing component configured to execute the one or more routines stored in the memory, wherein the one or more routines, when executed by the processing component, cause acts to be performed comprising:
processing a set of seismic data comprising a plurality of features of interest using a classification algorithm that is a multi-class classifier based on a decision tree that outputs a list of possible classifications for each feature of interest with an associated probability for each listed classification for a respective feature; and
running a ranking algorithm on the list of possible classifications, wherein the ranking algorithm outputs a ranked list of possible classifications for each feature of interest; wherein, during operation, the ranking algorithm:
generates a pool query set of respective queries related to the features of interest, wherein each query comprises a pair of ranked features of interest that has been classified as the same type of feature;
submits one or more queries to a reviewer to obtain reviewer feedback, wherein the reviewer feedback to each query comprises a selection of which feature in the pair of ranked features is more likely correctly classified; and
updates the operation of the ranking algorithm based on the reviewer feedback to the queries.

8. The seismic data analysis system of claim 7, wherein the multi-class classifier is configured to generate multiple classifications and associated probabilities for each feature of interest identified in the seismic data.

9. The seismic data analysis system of claim 7, wherein the list of possible classifications for each feature output by the classification algorithm comprises an initially ranked list.

10. The seismic data analysis system of claim 7, wherein the ranking algorithm selects the pair of ranked features of interest included in the pool query set based on angular diversity of the pair of ranked features of interest.

11. A method for analyzing seismic data, comprising the acts of:
accessing a set of seismic data comprising a plurality of features of interest;
classifying the plurality of features of interest as corresponding to a geological feature of interest using a classification algorithm, wherein the classification algorithm comprises a linear model;
selecting one or more features of interest from the plurality of features of interest for which the classification as a respective type of geological feature is ambiguous, wherein the one or more features of interest are selected based on the degree to which a correct classification of a respective feature of interest reduces the variance associated with the linear model such that the greatest number of features of interest having ambiguous classifications have their classification ambiguity resolved;
submitting one or more queries to a reviewer to obtain reviewer classifications of one or more of the features of interest for which the classification is ambiguous, wherein the one or more queries are prioritized based on the extent to which variance associated with the linear model will be reduced when the reviewer classification is obtained; and
updating the operation of the linear model based on the reviewer classifications.

12. The method of claim 11, wherein the linear model comprises a logistic regression algorithm.

13. The method of claim 11, wherein the acts of selecting one or more features of interest, submitting one or more queries to a reviewer, and updating the operation of the classification algorithm are triggered by changes detected in the set of seismic data.

14. The method of claim 11, comprising:
providing a training data set comprising a set of classified features of interest, wherein the training data set comprises different seismic data than is in the set of seismic data; and
generating the classification algorithm using the training data set.

15. The method of claim 14, wherein the training data set is mismatched with respect to the set of seismic data in the statistical distribution of features of interest.

16. The method of claim 15, wherein the reviewer classifications update the classification algorithm so as to reduce the mismatch between the training data set and the set of seismic data.

17. A seismic data analysis system, comprising:
a memory storing one or more routines; and
a processing component configured to execute the one or more routines stored in the memory, wherein the one or more routines, when executed by the processing component, cause acts to be performed comprising:
accessing a set of seismic data comprising a plurality of features of interest;
classifying the plurality of features of interest as corresponding to a geological feature of interest using a classification algorithm, wherein the classification algorithm comprises a linear model;
selecting one or more features of interest from the plurality of features of interest for which the classification as a respective type of geological feature is ambiguous, wherein the one or more features of interest are selected based on the degree to which a correct classification of a respective feature of interest reduces the variance associated with the linear model such that the greatest number of features of interest having ambiguous classifications have their classification ambiguity resolved;
submitting one or more queries to a reviewer to obtain reviewer classifications of one or more of the features of interest for which the classification is ambiguous, wherein the one or more queries are prioritized based on the extent to which variance associated with the linear model will be reduced when the reviewer classification is obtained; and
updating the operation of the linear model based on the reviewer classifications.

18. The seismic data analysis system of claim 17, wherein the linear model comprises a logistic regression algorithm.

19. The seismic data analysis system of claim 17, wherein the one or more routines further comprise routines, which, when executed causes acts to be performed comprising:
   providing a training data set comprising a set of classified features of interest, wherein the training data set comprises different seismic data than is in the set of seismic data; and
   generating the classification algorithm using the training data set.

20. The seismic data analysis system of claim 19, wherein the training data set is mismatched with respect to the set of seismic data in the statistical distribution of features of interest.

21. The seismic data analysis system of claim 20, wherein the reviewer classifications update the classification algorithm so as to reduce the mismatch between the training data set and the set of seismic data.

* * * * *